(12) United States Patent
Knauft et al.

(10) Patent No.: US 11,947,827 B2
(45) Date of Patent: Apr. 2, 2024

(54) SYNCHRONIZING A STALE COMPONENT OF A DISTRIBUTED OBJECT USING A DELTA COMPONENT DURING MAINTENANCE

(71) Applicant: VMware, Inc., Palo Alto, CA (US)

(72) Inventors: Eric Knauft, San Francisco, CA (US); Enning Xiang, San Jose, CA (US); Mansi Shah, San Jose, CA (US); Pascal Renauld, Palo Alto, CA (US); Yiqi Xu, Redwood City, CA (US); Ojan Thornycroft, Los Altos, CA (US); Pratik Desai, San Jose, CA (US); Zhihao Yao, Cupertino, CA (US); Yizhou Luo, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/875,624

(22) Filed: May 15, 2020

(65) Prior Publication Data
US 2021/0357122 A1    Nov. 18, 2021

(51) Int. Cl.
*G06F 3/06* (2006.01)
(52) U.S. Cl.
CPC ............ *G06F 3/065* (2013.01); *G06F 3/0617* (2013.01); *G06F 3/0689* (2013.01)
(58) Field of Classification Search
CPC ....... G06F 3/065; G06F 3/0617; G06F 3/0689
See application file for complete search history.

(56) References Cited

U.S. PATENT DOCUMENTS

| | | | | |
|---|---|---|---|---|
| 7,725,651 B2 * | 5/2010 | Saito | ................... | G06F 11/1456 711/114 |
| 2005/0060609 A1 * | 3/2005 | El-Batal | .............. | G06F 11/1076 714/20 |
| 2007/0055836 A1 * | 3/2007 | Yamato | ............... | G06F 11/2082 711/162 |
| 2008/0281879 A1 * | 11/2008 | Kawamura | ......... | G06F 11/1469 |
| 2010/0023716 A1 * | 1/2010 | Nemoto | .............. | G06F 11/1451 711/E12.103 |
| 2017/0160967 A1 * | 6/2017 | Cohen | ................... | G06F 3/0613 |
| 2020/0133503 A1 * | 4/2020 | Sun | ....................... | G06F 3/0604 |

* cited by examiner

*Primary Examiner* — Eric Cardwell
(74) *Attorney, Agent, or Firm* — King Intellectual Asset Management (57) ABSTRACT

The disclosure herein describes enhancing data durability of a base component using a delta component. A delta component is generated based on the base component becoming unavailable. The delta component is configured to include unwritten storage space with an address space matching the base component and a tracking bitmap associated with data blocks of the address space of the delta component. Write operations targeted for the base component are routed to the delta component. Based on the routed write operations, bits associated with data blocks affected by the write operations are changed in the tracking bitmap. Based on the base component becoming available, data blocks affected by routed write operations are identified based on the tracking bitmap and the identified data blocks are synchronized from the delta component to the base component. The delta component is then removed.

18 Claims, 8 Drawing Sheets

SYNCHRONIZING A STALE COMPONENT OF A DISTRIBUTED OBJECT USING A DELTA COMPONENT DURING MAINTENANCE

BACKGROUND

Distributed data objects can have multiple data components that are placed in different fault domains and/or on different servers. Sometimes, servers need to go into a maintenance mode, such that the components on the servers become unavailable. The data availability and durability of the distributed data object with which the unavailable components are associated is reduced when those components are unavailable. Further, when the servers exit maintenance mode and the components come back online, they may be stale due to missing some input/output traffic while unavailable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Solutions for enhancing data durability of a base component using a delta component are disclosed that include generating, by a processor, a delta component based on the base component becoming unavailable, wherein the delta component is configured to include unwritten storage space with an address space matching an address space of the base component and a tracking bitmap including a plurality of bits associated with data blocks of the address space of the delta component; routing, by the processor, a write operation targeted for the base component to the delta component; based on routing the write operation targeted for the base component to the delta component, changing, by the processor, a bit associated with a data block affected by the routed write operation in the tracking bitmap of the delta component; based on detecting the base component becoming available, synchronizing, by the processor, using the tracking bitmap, the data block affected by the routed write operation from the delta component to the base component; and removing, by the processor, the delta component.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Distributed data objects may be configured to store data spread out among multiple hardware devices and physical locations to both secure the data against loss due to hardware failure, software failure, or for other reasons (data durability) and to enable access to the stored data despite periodic downtimes for individual devices (data availability). Providing these features typically includes storing the data redundantly (e.g., storing the same data on multiple devices and/or in multiple locations) within data components of the distributed data object, such that, in the event that one server device fails, the data is still accessible on another server device that stores the data. For instance, data components of a distributed data object may include components configured to store subset of data associated with the distributed data object, such that the total data is stored across multiple components and/or components that mirror each other, such that the data of the distributed data object is stored redundantly on multiple components (e.g., the base components, mirrored components, and delta components described herein). When a component of the distributed data object is going to become unavailable, the data durability and availability will be reduced for the time period during which the component is unavailable and, when the component becomes available again, it may be in a stale state and require synchronization with an up-to-date component.

The described method and system enable the generation of temporary delta components for use during downtime of conventional data components. The delta components are configured to temporarily track and mirror data changes that would have been performed in the unavailable component if it were available. Thus, the delta component provides enhanced data redundancy during the downtime of the component. Further, the delta component enables a more efficient method for bringing the associated component back up to date when it becomes available again and is in a stale state.

Aspects of the disclosure provide a computerized method and system for enhancing data durability of a base component using a delta component. A delta component is generated based on the base component becoming unavailable. The delta component is configured to include unwritten storage space with an address space matching the base component and a tracking bitmap associated with data blocks of the address space of the delta component. Write operations targeted for the base component are routed to the delta component. Based on the routed write, bits associated with data blocks affected by the write operations are changed in the tracking bitmap. Based on the base component becoming available, data blocks affected by routed write operations are identified based on the tracking bitmap and the identified data blocks are synchronized from the delta component to the base component. The delta component is then removed.

The disclosure addresses the challenges, among others, of maintaining data durability and availability during and after downtime of data components of a distributed data object. The described methods and systems operate in an unconventional way by using a temporary delta component to track input/output (I/O) traffic and store associated data changes during the downtime of a component. Further, the synchronization, or resyncing, of the component when it becomes available again is made more efficient when using the delta component as the synchronization source instead of another mirrored component. For instance, less bandwidth and processing resources are required when synchronizing from a delta component because the unwritten sections of the delta component may be filtered out prior to synchronizing, enabling the synchronization process to avoid significant write amplification (e.g., when more data is written to the media than was sent for writing in the I/O writes).

Figure 1:
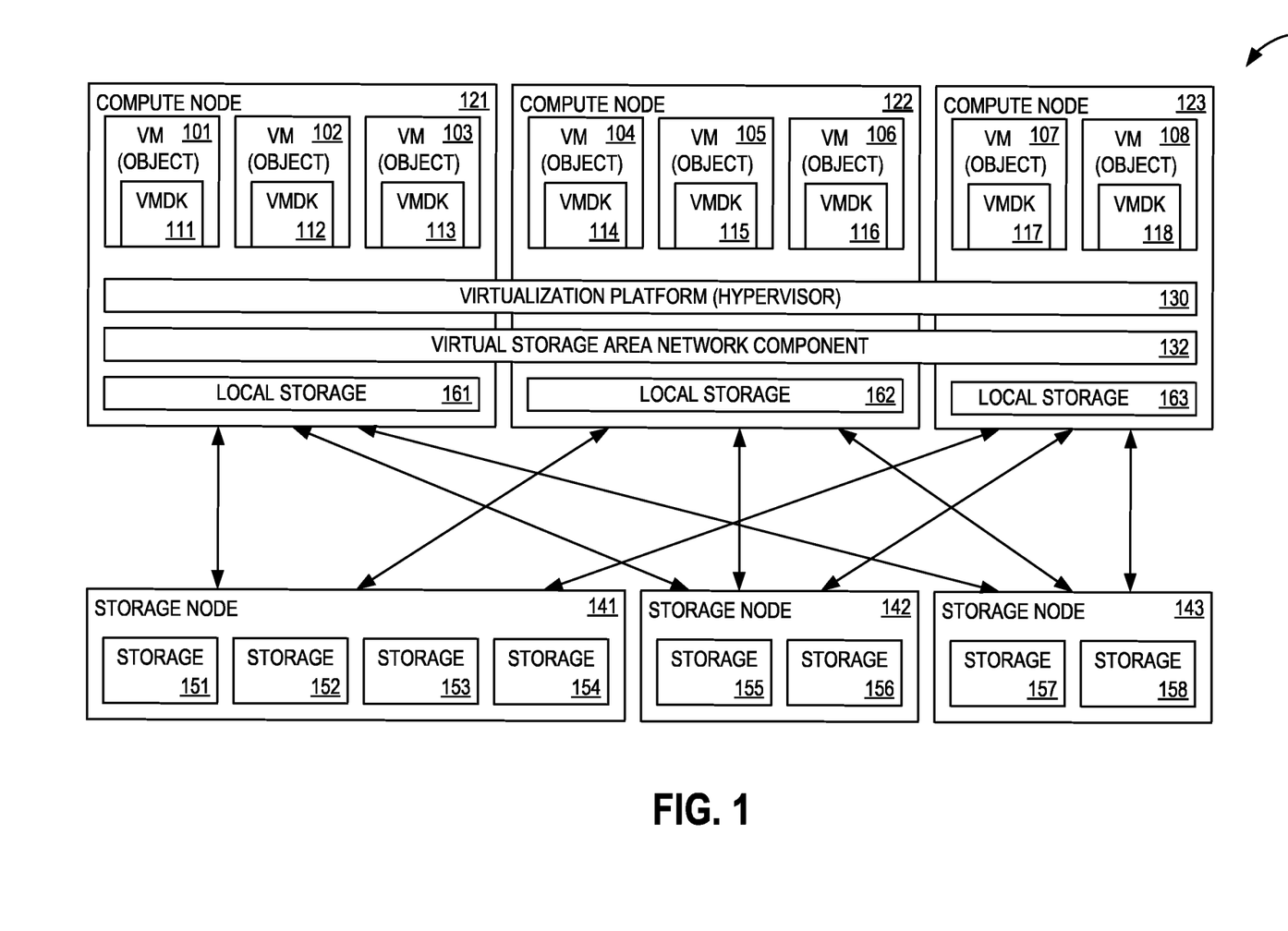
FIG. 1 is a block diagram illustrating a system architecture that is comprised of a set of compute nodes interconnected with each other and a set of storage nodes according to an embodiment.

FIG. 1 is a block diagram illustrating a system architecture 100 that is comprised of a set of compute nodes 121-123 interconnected with each other and a set of storage nodes 141-143 according to an embodiment. In other examples, a different number of compute nodes and storage nodes may be used. Each compute node hosts multiple objects, which may be virtual machines (VMs), containers, applications, or any compute entity that can consume storage. When objects are created, they are designated as global or local, and the designation is stored in an attribute. For example, compute node 121 hosts objects 101, 102, and 103; compute node 122 hosts objects 104, 105, and 106; and compute node 123 hosts objects 107 and 108. Some of objects 101-108 are local objects. In some examples, a single compute node may host 50, 100, or a different number of objects. Each object uses a virtual machine disk (VMDK), for example VMDKs 111-118 for each of objects 101-108, respectively. Other implementations using different formats are also possible. A virtualization platform 130, which includes hypervisor functionality at one or more of computer nodes 121, 122, and 123, manages objects 101-108.

In some examples, various components of architecture 100, for example compute nodes 121, 122, and 123, and storage nodes 141, 142, and 143 are implemented using one or more computing apparatuses 1018 of FIG. 10.

Virtualization software that provides software-defined storage (SDS), by pooling storage nodes across a cluster, creates a distributed, shared data store, for example a storage area network (SAN). In some distributed arrangements, servers are distinguished as compute nodes (e.g., compute nodes 121, 122, and 123) and storage nodes (e.g., storage nodes 141, 142, and 143). Alternatively, or additionally, some arrangements include servers and/or other nodes that act as both compute nodes and storage nodes. Such an arrangement may be referred to as a hyperconverged infrastructure. Although a storage node may attach a large number of storage devices (e.g., flash, solid state drives (SSDs), non-volatile memory express (NVMe), Persistent Memory (PMEM)) processing power may be limited beyond the ability to handle input/output (I/O) traffic. During data writes to storage devices, a phenomenon termed write amplification may occur, in which more data is written to the physical media than was sent for writing in the I/O. Write amplification is an inefficiency that produces unfavorable I/O delays and may arise as a result of synchronization between mirrored components to bring a stale component up to date, as described herein.

Storage nodes 141-143 each include multiple physical storage components, which may include flash, solid state drives (SSDs), non-volatile memory express (NVMe), persistent memory (PMEM), and quad-level cell (QLC) storage solutions. For example, storage node 141 has storage 151, 152, 152, and 154; storage node 142 has storage 155 and 156; and storage node 143 has storage 157 and 158. In some examples a single storage node may include a different number of physical storage components. In the described examples, storage nodes 141-143 are treated as a SAN with a single global object, enabling any of objects 101-108 to write to and read from any of storage 151-158 using a virtual SAN component 132. Virtual SAN component 132 executes in compute nodes 121-123.

Thin-provisioning may be used, and in some examples, storage nodes 141-143 do not require significantly more processing power than is needed for handling I/O traffic. This arrangement may be less expensive than in an alternative embodiment in which all of storage nodes 141-143 have the same or similar processing capability as compute node 121. Using the disclosure, compute nodes 121-123 are able to operate with a wide range of storage options, including those with minimal processing capability.

In some examples, compute nodes 121-123 each include a manifestation of virtualization platform 130 and virtual SAN component 132. Virtualization platform 130 manages the generating, operations, and clean-up of objects 101 and 102, including the moving of object 101 from compute node 121 to another compute node, to become a moved object. Virtual SAN component 132 permits objects 101 and 102 to write incoming data from object 101 and incoming data from object 102 to storage nodes 141, 142, and/or 143, in part, by virtualizing the physical storage components of the storage nodes.

Figure 2:
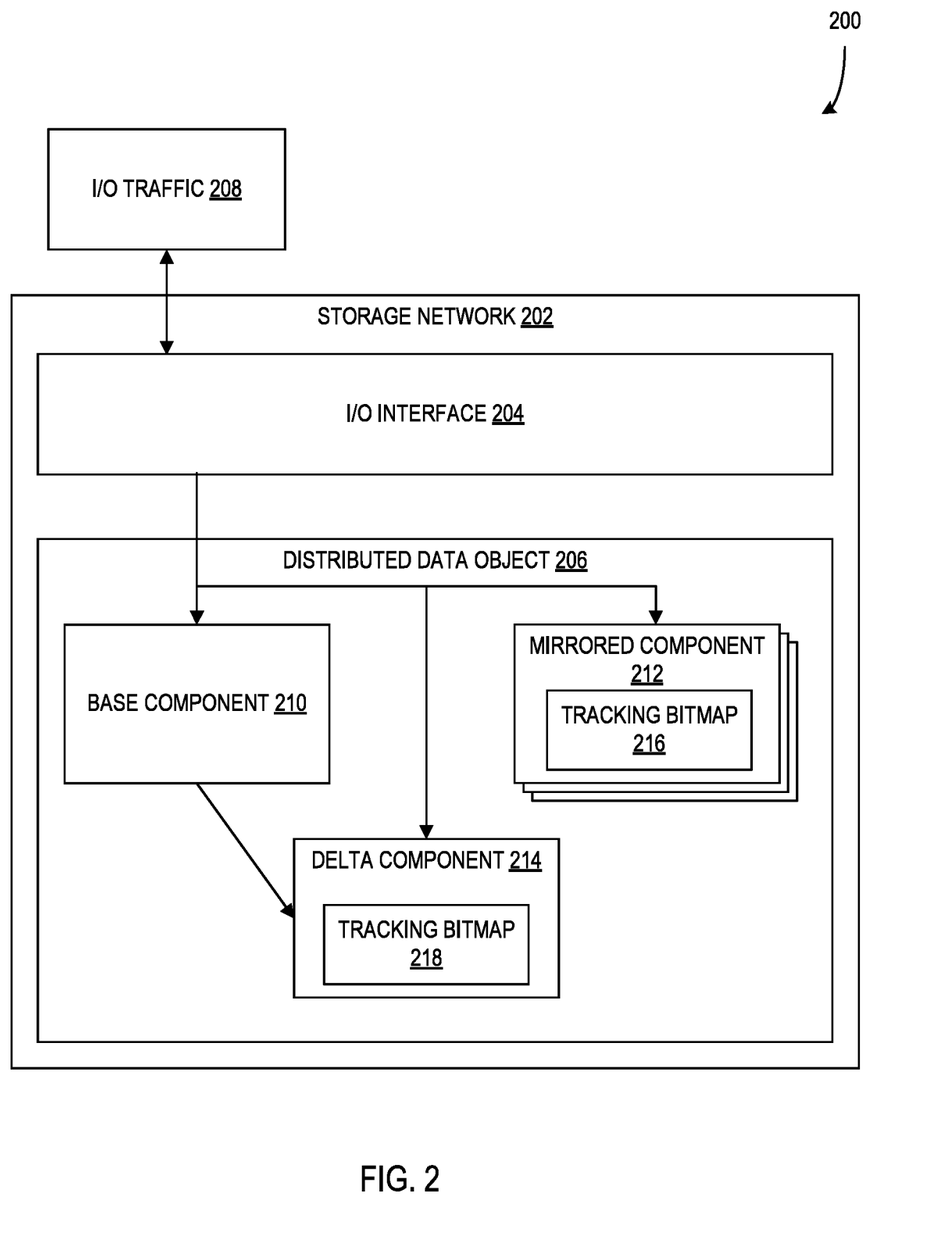
FIG. 2 is a block diagram illustrating a system configured for generation and management of delta components associated with components of a distributed data object according to an embodiment.

FIG. 2 is a block diagram illustrating a system 200 configured for generation and management of delta components 214 associated with data components (e.g., base component 210 and mirrored components 212) of a distributed data object 206 according to an embodiment. In some examples, the system 200 is implemented on a component or components of a system architecture such as system architecture 100 of FIG. 1. For instance, in some examples, the storage network 202 is implemented as a virtual storage network component or virtual SAN component 132 of FIG. 1 as described above.

The storage network 202 includes an I/O interface 204 and a distributed data object 206 and is configured to receive and/or otherwise interact with I/O traffic 208, including I/O messages or instructions for writing data to the distributed data object 206. In other examples, the storage network 202 may include more and/or differently arranged distributed data objects and/or another data storage object or structure without departing from the description. The I/O interface 204 includes hardware, firmware, and/or software configured for receiving I/O traffic 208 from sources outside the storage network 202 and writing or otherwise sending the associated I/O instructions to the distributed data object 206 of the storage network 202. In many examples, the I/O traffic 208 includes instructions to write data to the storage component or components of the distributed data object 206 for storage therein. Additionally, the I/O interface 204 may be configured for retrieving stored data from the distributed data object 206 and provide such retrieved data to sources outside of the storage network 202. Further, the I/O interface 204 may be configured for facilitating communication of data between multiple distributed data objects or other components within the storage network 202 without departing from the description.

The distributed data object 206 is configured to store data across a plurality of data components (data structures configured to store at least a portion of the total data associated with the distributed data object 206), such as the base component 210, the mirrored components 212, and the delta component 214. In some examples, the distributed data object 206 stores data redundantly across multiple components. For instance, multiple copies of a set of data may be stored on each of the base component 210 and the mirrored components 212, such that the data is preserved in the event that one or some of the components fail. The distributed data object 206 may be configured to provide enhanced reliability and availability of the stored data through the redundant storage of data on the multiple components, enabling the data to be accessed despite failure or unavailability of individual components.

It should be understood that, while the base component 210 is illustrated separately from the other mirrored components 212, in other examples, the base component 210 is effectively identical to the other mirrored components 212. Further, the described functionality of the delta component 214 herein may also apply to components of the distributed data object 206 other than the base component 210 in other examples. For instance, a delta component may be generated and used as described herein with respect to the mirrored component 212 such that the mirrored component 212 operates as a base component as described herein.

In some examples, components (e.g., the base component 210) of the distributed data object 206 are configured to have downtime for maintenance or other reasons (e.g., the base component 210 and/or a host device associated therewith may enter a maintenance mode). Because of the previously-described redundancy, the distributed data object 206 is typically capable of continuing to provide access to stored data and to receive additional I/O traffic to write data on the mirrored components 212 that remain active. Further, the distributed data object 206 and/or the associated storage network 202 are configured to enhance the reliability and availability of data storage by creating a delta component 214 when the base component 210 is preparing to become deactivated or otherwise go offline. The delta component 214 is configured as a temporary component that is configured to log or otherwise track I/O traffic and associated data changes that would be directed to the base component 210 if it were not offline. Further, when the base component 210 becomes reactivated, the delta component 214 is configured to synchronize logged or tracked I/O traffic with the reactivated component such that the base component 210 is brought up-to-date with respect to I/O traffic that occurred during the period in which it was inactive. The use of the delta component 214 as described provides additional redundancy and reliability of the distributed data object during the downtime of the base component 210.

In some examples, when a host device or entity is transitioned into a maintenance mode, the components of the host become inaccessible and the availability of the data on the associated distributed data object 206 is reduced or weakened, such that the object is able to tolerate fewer fault domain failures. Further, the components become "stale" due to potentially missing out on I/O traffic during the downtime. Stale components (e.g., the base component 210) keep the stale state until they synchronize with an active mirrored component or delta component. If there is no available component for synchronizing, stale objects are never able to restore data availability. For example, if the host of the base component 210 enters a maintenance mode for a period of time and the base component 210 is unavailable during incoming I/O traffic 208, when the base component 210 is reactivated, it is considered "stale", in that it has not been updated to include the incoming I/O traffic 208 that occurred during the downtime. If the delta component 214 is not generated and operated as described herein and there are no mirrored components 212 that are active and available for synchronizing, the base component 210 and the associated distributed data object 206 will lose data availability forever.

Rather, prior to the base component 210 becoming inactive for maintenance, the delta component 214 is generated to track incoming I/O traffic 208 during the downtime and to provide a source for synchronizing when the base component 210 is reactivated. In some examples, the incoming I/O traffic 208 is also written to the mirrored components 212, but the delta component 214 provides an additional resource for protecting the availability of the data during the downtime by providing "eventual data availability" (e.g., other mirrored components 212 may experience failure or inactivity during the downtime or otherwise prior to the base component 210 synchronizing to come back up-to-date).

The delta component 214 is configured to store the latest data of the data blocks affected by the I/O traffic 208 that is not captured by the deactivated base component 210. The base component 210 can then be brought up to date by synchronizing with the delta component 214 before the delta component 214 is deleted or otherwise removed.

In some examples, the delta component 214 is not a full copy of the base component 210. Instead, the delta component 214 is configured to include the address space of the base component 210, but the data locations are unwritten, rather than written with copied data from the base component 210. As a result, the delta component 214 does not alone provide full data availability as might be provided by an active mirrored component 212. However, because the delta component 214 tracks incoming I/O during the inactive period of the base component 210, the delta component 214 does enable full data availability to be eventually provided by the base component 210 after synchronizing. Thus, the delta component 214 provides "eventual data availability".

A typical reason for a component to be deactivated is a maintenance mode of the associated host device, during which software may be upgraded on the host device. Such a process may cause a component to be inactive for up to an hour, for example. The delta component 214 is configured to be capable of tracking all I/O traffic 208 intended for the base component 210 during that time. If all other mirrored components 212 fail or otherwise become inactive during that time, the delta component 214 provides an additional resource for protecting the availability of the data of the distributed data object 206.

The mirrored components 212 and delta component 214 are configured to include tracking bitmaps 216 and tracking bitmap 218, respectively. The tracking bitmaps 216 and 218 are used by the associated components to track data blocks that are changed due to incoming I/O traffic 208 during downtime of the base component 210. By tracking which data blocks are changed during the downtime, the base component 210 can be brought up to date by synchronizing only those changed data blocks as indicated in the tracking bitmaps 216 and 218. In some examples, the tracking bitmaps 216 and 218 are configured to include a plurality of data bits with each data bit mapping to an individual data block within the address space of the component. The data bits of the tracking bitmap may be initialized to '0' and, upon incoming I/O traffic 208 causing data in a data block to change, the associated component updates the mapped data bit of the data block to be a '1', indicating that that data block will need to be provided to the base component 210 in order to bring it up-to-date, once the base component 210 is available again. The use of tracking bitmaps 216 and 218 are described in greater detail below with respect to FIG. 4.

Because the delta component 214 does not need to have the historical written I/O of the object before creation or generation, the delta component 214 becomes active directly without going through any synchronization procedure after being created. Delta component 214 has three major states (the persistent state and the memory state of these three are same). Once created successfully, it will go to active state. If the delta component is disconnected from the owning distributed data object, it transitions into an absent state. In some examples, a system management program is configured to immediately mark the absent component as a degraded component to mark it for removal by an associated cleanup process. In some examples, it may take more than an hour for the cleanup process to clean up an absent component. However, it is not necessary to leave an inactive delta component to wait for such a time window, because once the base component is synchronized, the purpose of the delta component 214 is completed and the component 214 will become stale if/when new I/O traffic is committed to another active mirrored component. To avoid letting a degraded delta component 214 wait for removal and occupy system resources while waiting, the degraded delta component 214 may be deleted quickly by moving it to the degraded state and notifying the cleanup process to delete it as soon as possible. In alternative examples, the degraded delta component 214 may be promoted back to active if it has not become stale and its disk is healthy.

Figure 3:
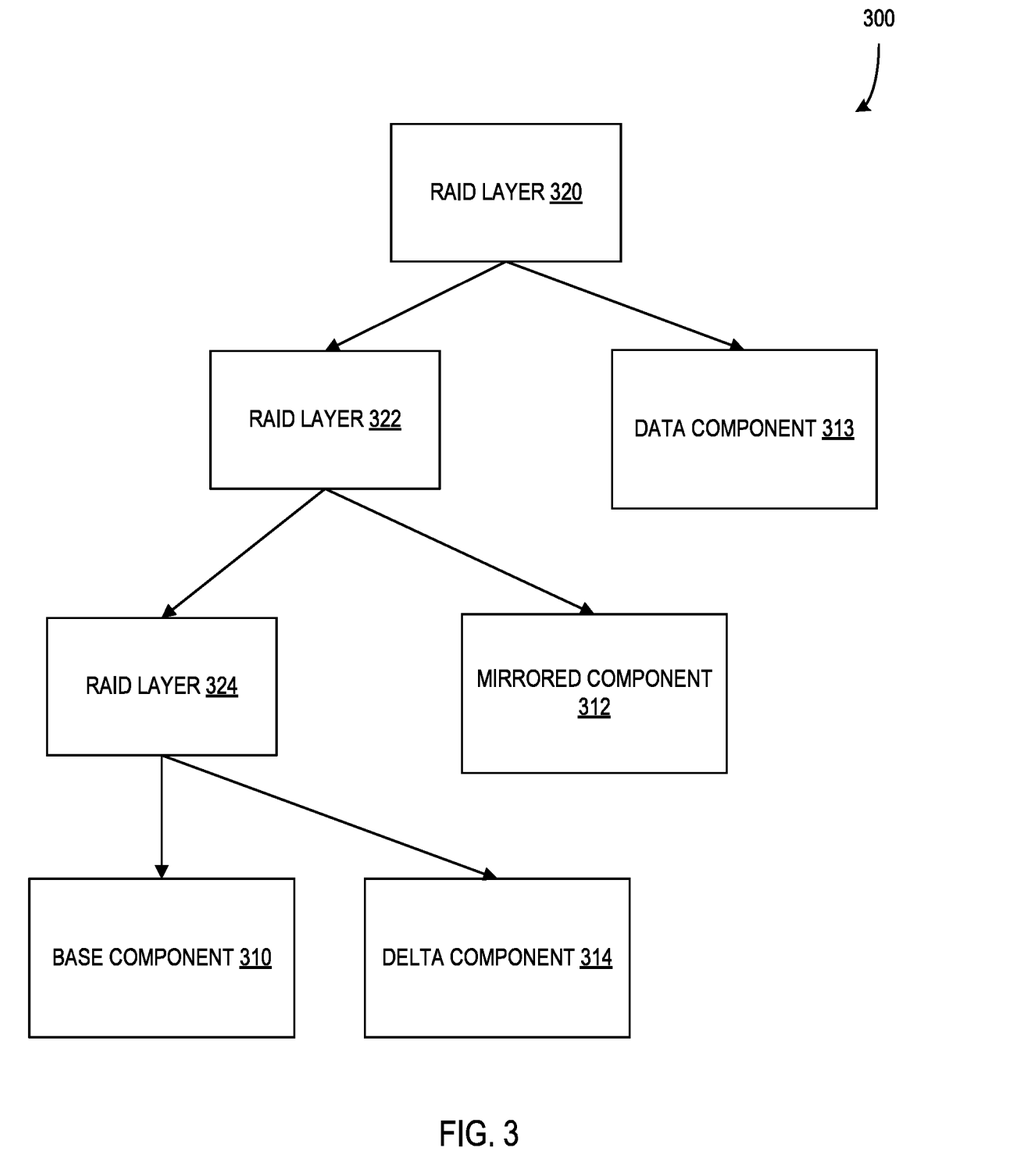
FIG. 3 is a block diagram illustrating a system configured with a redundant array of independent disks (RAID) for use with delta components according to an embodiment.

FIG. 3 is a block diagram illustrating a system 300 configured with a redundant array of independent disks (RAID) (e.g., RAID layers 320, 322, and 324) for use with delta components (e.g., delta component 314) according to an embodiment. In some examples, the system 300 is implemented by a component or components of a system such as system 100 of FIG. 1 and/or system 200 of FIG. 2 (e.g., the distributed data object 206 may include the RAID system 300). It should be understood that the RAID layers 320 and 322 may include layers configured for mirroring (e.g., RAID 1) the associated components (e.g., mirroring the mirrored component 312 and the components associated with the RAID layer 324). Additionally, or alternatively, the RAID layers 320 and 322 may include layers configured for "striping" (e.g., RAID 0), such that the components associated with such a layer share data storage associated with incoming I/O traffic. For instance, if RAID layer 320 is configured as a RAID 0 layer, data stored may be split between the component 313 and the components associated with RAID layer 322. The RAID layers 320 and 322 may be configured to combine both types, such that RAID layer 320 is configured for striping and RAID layer 322 is configured for mirroring (e.g., RAID 01), or vice versa (e.g., RAID 10). Further, the RAID layers 320, 322, and/or 324 may be configured with other RAID features or functionality without departing from the description herein (e.g., error correction of a RAID 2 configuration or various parity features of RAID 3, 4, 5, and/or 6 configurations). Additionally, or alternatively, the RAID layers may be configured with erasure coding (e.g., RAID 5 or 6 configurations) without departing from the description.

In order to enable the functionality of the delta component 314 as described herein, in some examples, the RAID layer 324 is configured for mirroring I/O traffic intended for the base component 310 between the base component 310 and the delta component 314. Thus, the configuration of the RAID layer 324 may be configured for mirroring independently from the overall arrangement of the RAID system 300. It should further be understood that, in other examples, the RAID system 300 may be organized in other arrangements and/or include more, fewer, or different RAID layers and associated components without departing from the description herein.

In some examples, the components "vote" when determining whether to commit or abort an I/O write to the associated distributed data object. The components vote to commit if they are in a state in which they can commit the I/O write. If the components as a group submit a threshold quantity of votes to commit the data, the data is committed to the distributed data object and the associated components. Alternatively, if the components do not submit a threshold quantity of votes to commit (e.g., several of the components are in an unavailable or failed state), the I/O write command is aborted for the distributed data object. As a result of aborting the command, a notification or alert may be sent to the source of the I/O write. In some examples, the voting process is handled according to a two-phase commit (2PC) configuration. The delta component as described herein has the same vote weight in such a process to decide whether I/O should be committed or aborted. Further, the algorithm to handle 2PC I/O failure recovery on the delta component will be same as that for the mirrored components under a RAID 1 or RAID erasure coding (EC) configuration. All relevant active delta components' votes are counted when calculating the "needed count" and "actual count" for an inflight I/O.

Further, it should be understood that, in configurations using RAID EC where conventional mirrored components of an object do not necessarily have the exact same data stored due to such a configuration, the use of the delta component to synchronize with the base component as described herein is a substantial improvement over synchronizing with the other mirrored components, as synchronizing with the other mirrored components requires a reconstruction of data from each component to obtain the data needed to write to the synchronizing base component.

Figure 4:
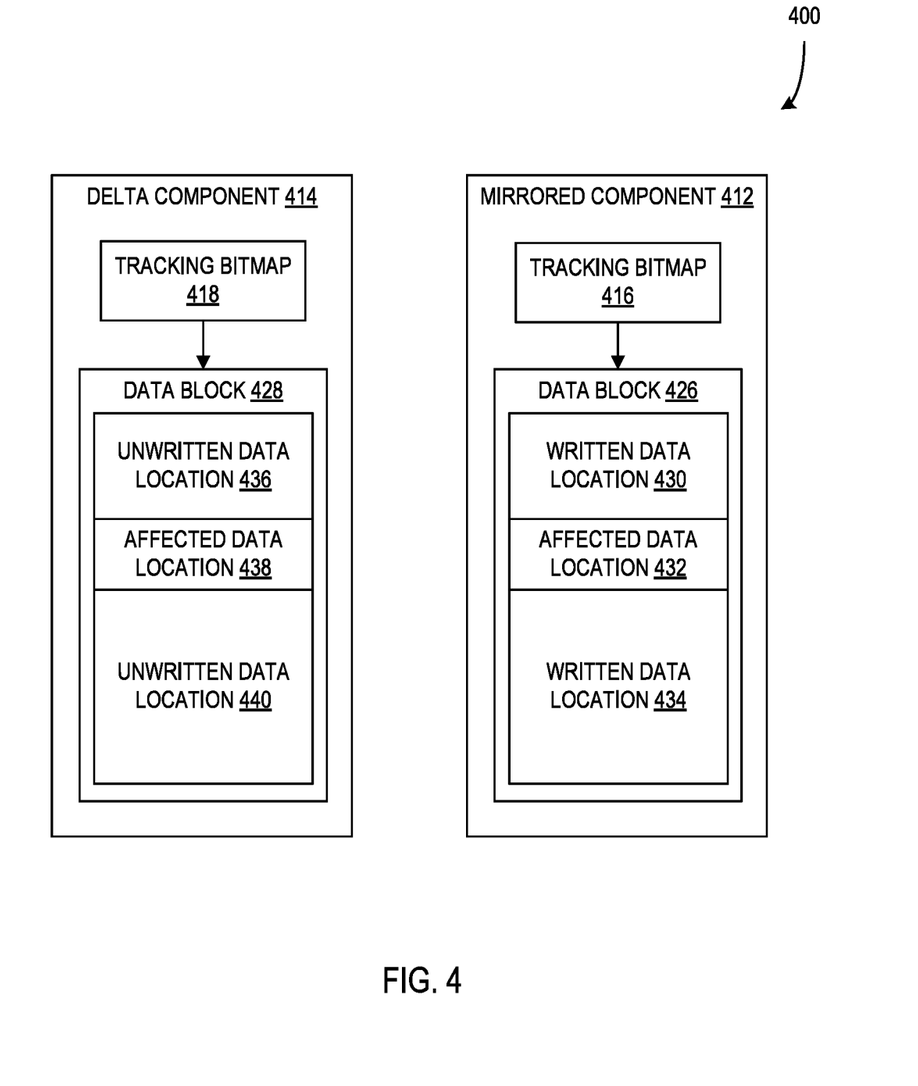
FIG. 4 is a block diagram illustrating tracking bitmaps of a delta component and a mirrored component and associated data blocks according to an embodiment.

FIG. 4 is a block diagram 400 illustrating tracking bitmaps 418 and 416 of a delta component 414 and a mirrored component 412 and associated data blocks 428 and 426 according to an embodiment. In some examples, the delta component 414 and the mirrored component 412 are included in a system such as system 200 of FIG. 2 as described herein. Further, it should be understood that the delta component 414 and the mirrored component 412 are configured to mirror the same component (e.g., base component 210) during a period when the component being mirrored is inactive, such that the tracking bitmaps 418 and 416 are used to track incoming I/O traffic for use in synchronizing with the component when it is reactivated.

The tracking bitmaps 418 and 416 each include references to data blocks 428 and 426, respectively. As previously described, the tracking bitmaps include bits that are associated with specific data blocks of storage space and those bits are changed in the tracking bitmaps when the associated data blocks are changed due to incoming I/O. As illustrated, the data blocks 428 and 426 are data blocks that include "affected" data locations 438 and 432 respectively, which are data locations that have been changed due to incoming I/O during the downtime of the component that is being mirrored. The data of the affected data locations 438 and 432 will need to be provided to the inactive component in order to bring it up to date after the downtime is over. Because both the delta component 414 and the mirrored component 412 are configured to mirror the inactive component, the data written to the affected data locations 438 and 432 is substantially identical.

However, the delta component 414 is not an exact copy of the inactive component or the mirrored component 412 and, as a result, the data locations of the data blocks of the delta component 414 comprise primarily unwritten data locations. For instance, the data block 428 includes unwritten data locations 436 and 440 in addition to the affected data location 438. In some examples, the unwritten data locations 436 and 440 are identifiable as "unwritten" in that they have been initialized (e.g., set to '0') or otherwise assigned values indicating the locations are unwritten. By comparison, the mirrored component 412 is a full copy of the inactive component that is configured to mirror all of the data locations of the inactive component such that the data block 426 includes the affected data location 432 and also written data locations 430 and 434. The data block 426, and potentially many other data blocks of the mirrored component 412, include data written to the mirrored component 412 prior to the downtime of the inactive component and, as a result, the data block 426 may already be populated with data when the mirrored component 412 begins tracking I/O traffic during the downtime of the inactive component.

As a result of this difference, when bringing the inactive base component back up to date by synchronizing, using the delta component 414 may substantially reduce the occurrence of write amplification when copying affected data of data blocks to the recently activated base component when compared with the synchronization process using the mirrored component 412. For instance, because the data block 428 includes substantial unwritten sections, the synchronization process is able to identify the affected data location 438 specifically and limit the copying of data to just the affected data location 438 rather than copying the entire data block 428. Alternatively, because the data block 426 of the mirrored component 412 includes both the affected data location 432 and other written data locations 430 and 434, the system is not capable of identifying which locations of the data block 426 need to be copied. As a result, synchronizing the base component with the mirrored component 412 requires the copying of the entire data block 426 to ensure that the base component is brought up to date. Thus, the written data locations 430 and 434 of the data block 426 must be copied to the equivalent locations within the base component, even though those equivalent locations already contain the written data, causing write amplification.

The process of synchronizing a base component with a delta component 414 includes the four operations: estimating the synchronization workload using the tracking bitmap, reconciling the base component (e.g., resolving unresolved I/O), filtering out unwritten portions of the workload, and copying the data of the workload. In examples where the delta component 414 is present, there are two types of sources for three of the above four operations to synchronize the base component: the mirrored component 412 and the delta component 414. There are several possible ways to make use of the two types of synchronization sources.

First, the system may be configured to only use the regular mirror components. This is the same process as synchronizing a base component when a delta component 414 is not present. The performance of such a process remains the same as that of a typical synchronization without a delta component 414, and the delta component 414 is only used when the distributed data object (e.g., the mirrored components 412) does not otherwise have data availability. The drawback is that the process does not take advantage of the delta component 414 to get the best performance as described herein.

Second, the system may be configured to use mixed mirror sources (e.g., the mirrored component 412 and the delta component 414. In this approach, the synchronization engine can pick up any sources (including regular mirrored components and delta components) for relevant operations as long as they are available, and the synchronization workflow will continue so long as at least one source remains available. This process may give the best performance, but it must be configured to handle mismatches when synchronization sources are mixed. The process can always use the delta component 414 to get written data blocks and data locations and read data by default, but if the delta component 414 becomes unavailable, the process must track the type of synchronization source used up to that point and ensure that the correct data is copied from the synchronization source. For instance, if using the delta component 414, the unwritten data locations may be filtered out prior to copying as described herein, but if the process must switch to using a mirrored component 412 prior to completion of the synchronization, the process must also change to fully copying the affected data blocks of the mirrored component 412 to complete the synchronization process. Additionally, this process presents challenges with respect to managing issues that may be related to either the delta components or the mirrored components.

Third, the system may be configured to use a fixed mirror source for each synchronization process and to prioritize the use of delta components 414 if they are available. In this configuration, if the source of the synchronization process becomes unavailable during the process, the system is configured to restart the process using another available source rather than attempting to continue the process with a different source. In most cases, this configuration takes advantage of the described advantages of the delta component 414 due to prioritizing it over other mirrored components 412. In some situations, when the delta component 414 becomes unavailable prior to completion of the synchronization, the process may be restarted using a mirrored component 412, which substantially increases the time and resource cost of the process. However, because the delta component 414 is quickly removed from the system once it becomes unavailable, the process will only ever need to switch between types of synchronization sources once during a process, as only mirrored components 412 will remain as available synchronization sources.

Figure 5:
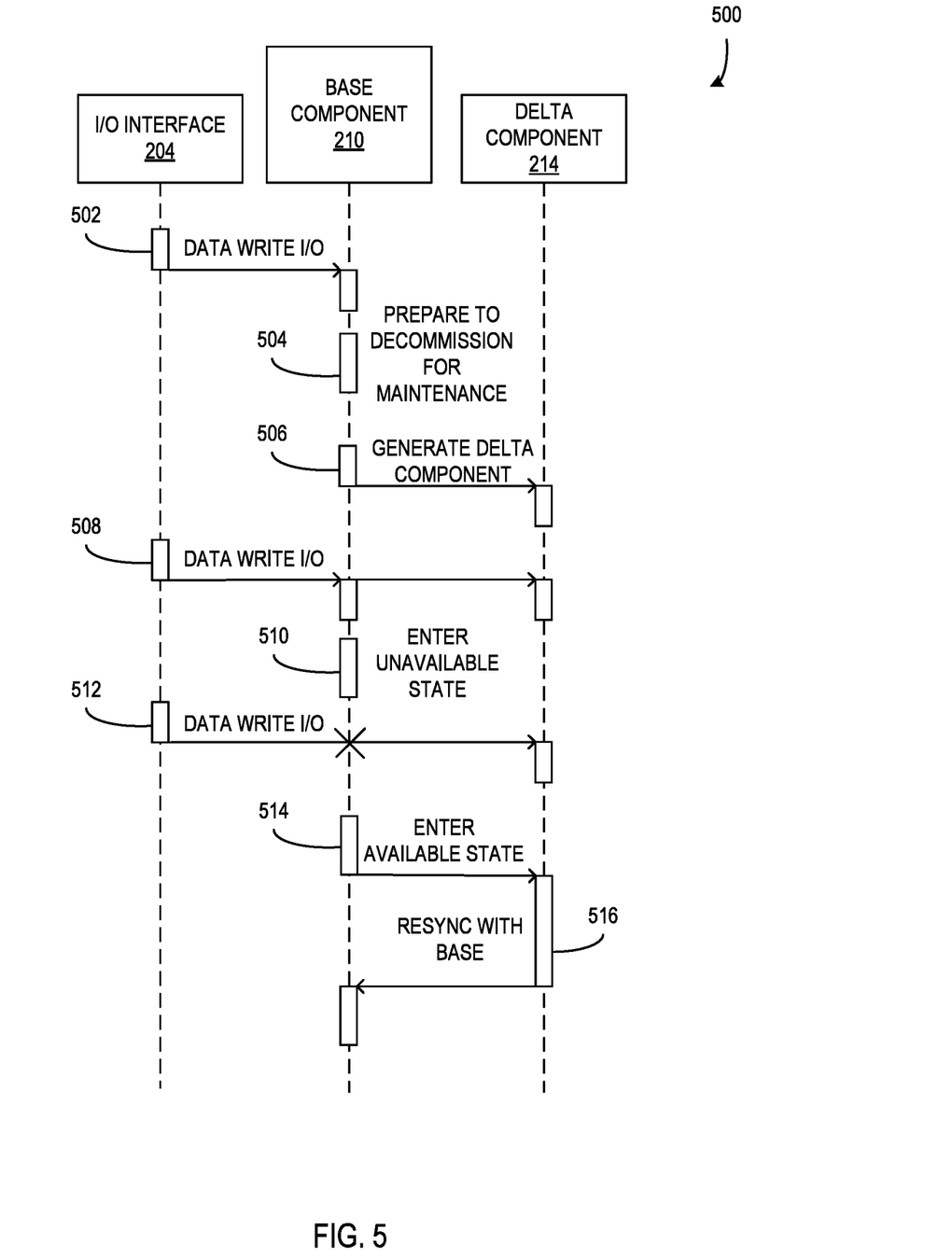
FIG. 5 is a sequence diagram illustrating a process of generating a delta component, decommissioning an associated component, and synchronizing the associated component from the delta component according to an embodiment.

FIG. 5 is a sequence diagram illustrating a process 500 of generating a delta component 214, decommissioning an associated component 210, and synchronizing the associated component 210 from the delta component 214 according to an embodiment. In some examples, the process 500 is performed by a component or components of a system such as system 200 of FIG. 2 as described herein. At 502, data write I/O is provided to the active base component 210 from the I/O interface 204. In some examples, the process 500 includes multiple data write I/O messages to the base component 210 prior to the process 500 proceeding to 504.

At 504, the base component 210 prepares to enter a decommissioned state or otherwise an unavailable state for maintenance. For instance, if a host device upon which the base component 210 is disposed is going to transition into a maintenance mode, the system schedules the base component 210 to enter a decommissioned or unavailable state during the maintenance of the host device. Additionally, or alternatively, the base component 210 may prepare to enter the unavailable state for other reasons without departing from the description.

As part of preparing to enter the unavailable state, a delta component 214 is generated by or in association with the base component 210 at 506. In some examples, generating the delta component 214 includes generating a tracking bitmap with which the delta component 214 is configured to track changes to the data address space due to data write I/O during the downtime of the base component. The delta component 214 is configured to comprise unwritten data blocks and to mirror changes targeted at the base component 210 after its generation.

For instance, at 508, prior to the base component 210 becoming decommissioned or unavailable but after the generation of the delta component 214, new data write I/O is provided to the base component 210. Because the delta component 214 is configured to mirror the base component 210 (e.g., via a RAID arrangement configured for mirroring), the data write I/O at 508 is also provided to the delta component 214. When the delta component 214 receives data write I/O, it tracks the changes made by the I/O using a tracking bitmap as described herein, so the data write I/O at 508 may be tracked in the tracking bitmap of the delta component 214, even though the base component 210 also receives the I/O prior to becoming unavailable.

At 510, the base component 210 enters an unavailable state (e.g., a decommissioned state based on an associated host device going into a maintenance mode). While the base component 210 is unavailable, data write I/O is sent from the I/O interface 204. Because the base component 210 is unavailable, it does not receive the data write I/O, but the delta component 214 does receive the data write I/O. Changes made to the address space are tracked in the tracking bitmap of the delta component 214. In some examples, multiple data write I/O's may be provided via the I/O interface 204 and received by the delta component 214 while the base component 210 is unavailable, as described herein.

At 514, the base component 210 enters an available state. In some examples, the host device of the base component 210 comes back online from a maintenance mode, enabling the base component 210 to become available and begin receiving data write I/O's and storing data based thereon. Because some data write I/O has been received that was intended for the base component 210 while the base component 210 was unavailable, the base component 210 is considered "stale". As a result, it must be synchronized with an active mirror, which is the delta component 214 in this case. In other examples, other mirrored components may also be available as synchronization sources for the base component 210, as described herein.

At 516, the delta component 214 synchronizes with the base component 210 to bring the base component 210 up to date. In some examples, the synchronization process includes identifying data blocks with changes that have been tracked by the delta component 214 and copying changes to those data blocks to the equivalent data blocks of the base component 210 as described herein.

Figure 6:
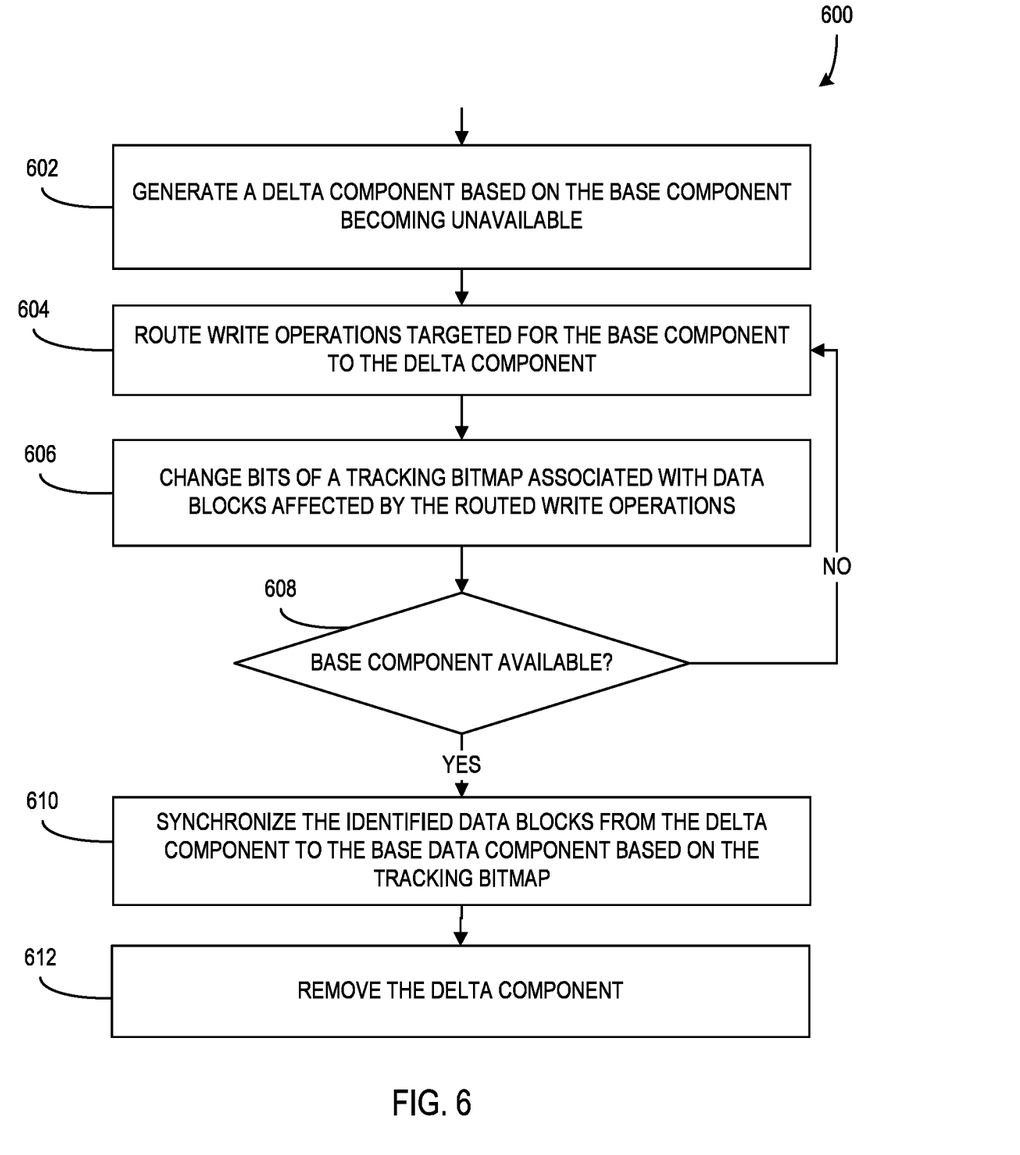
FIG. 6 is a flowchart illustrating a process of generating a delta component associated with a base component, tracking write operations using the delta component while the base component is unavailable, and synchronizing the base component using the delta component according to an embodiment.

FIG. 6 is a flowchart illustrating a process 600 of generating a delta component (e.g., delta component 214) associated with a base component (e.g., base component 210), tracking write operations using the delta component while the base component is unavailable, and synchronizing the base component using the delta component according to an embodiment. In some examples, the process 600 is performed or otherwise implemented by a component or components of a system such as system 200 of FIG. 2. Further, the process 600 may be performed with respect to data components in a RAID configuration (e.g., components arranged in RAID 0 levels, RAID 1 levels, RAID 5 levels, or RAID 6 levels). At 602, a delta component is generated based on the base component becoming unavailable. In some examples, the generation of the delta component is triggered by or otherwise based on a notification that the base component is going to become unavailable in the future (e.g., if a host device associated with the base component is going into a maintenance mode for a period of time).

At 604, write operations targeted for the base component are routed to the delta component. In some examples, the write operations are mirrored, such that they are routed to both the base component and the delta component in the event that there is overlap in activity between the generation of the delta component and the moment when the base component becomes unavailable.

At 606, the bits of the tracking bitmap of the delta component associated with data blocks affected by the routed write operations are changed.

At 608, if the base component is available, the process proceeds to 610. Alternatively, if the base component is still not available, the process returns to 604 to continue routing write operations to the delta component and updating the tracking bitmap accordingly.

At 610, the base component is now available and needs to be synchronized with the delta component to bring it up to date. The data blocks identified in the tracking bitmap are synchronized from the delta component to the base component. In some examples, synchronizing includes copying the identified data blocks from the delta component to the base component. The synchronization process is described in greater detail at least with respect to FIG. 4 and FIG. 8. In some examples, the tracking bitmap includes bits that refer to specific data blocks in the address space of the base component (e.g., 1 bit representing a 256 KB block of a 256 GB data component address space). If any portion of a data block has been changed, the tracking bit associated with the data block is set to indicate that a change occurred, and that data block is then identified for synchronization. In some examples, when the base component becomes available, the delta component is first identified and/or designated as the synchronization source from a set of possible synchronization sources (e.g., other mirrored components). In such examples, the system identifies a set of possible synchronization sources including the delta component and selects the delta component as a designated synchronization source from the set of possible synchronization sources based on a defined prioritization of available delta components (e.g., delta components are preferred over conventional mirrored components if they are available).

At 612, after the base component is brought up to date and is no longer stale due to synchronizing from the delta component, the delta component is removed. In some examples, removal of the delta component includes marking the delta component for removal and/or notifying a cleanup process of the system to delete or otherwise remove the delta component and free up the resources associated therewith.

Figure 7:
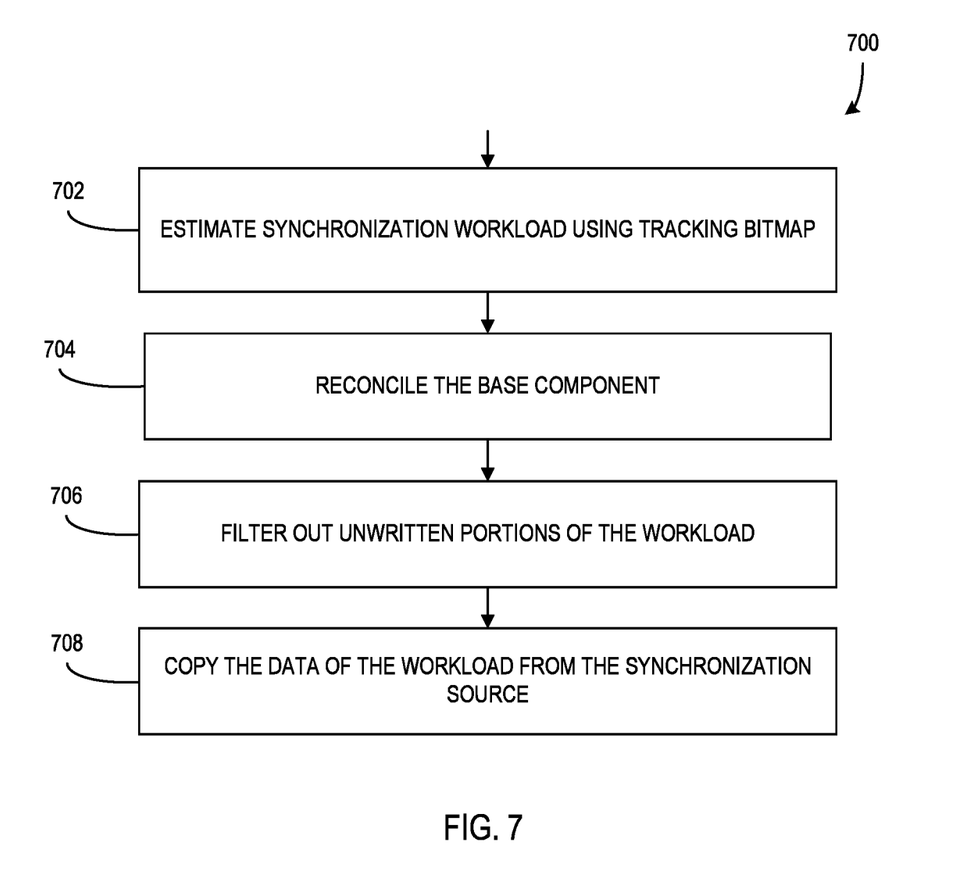
FIG. 7 is a flowchart illustrating a process of performing a synchronization operation from a delta component to an associated base component according to an embodiment.

FIG. 7 is a flowchart illustrating a process 700 of performing a synchronization operation from a delta component (e.g., delta component 214) to an associated base component (e.g., base component 210) according to an embodiment. In some examples, the process 700 is performed or otherwise implemented by a component or components of a system such as system 200 of FIG. 2. Further, the process 700 may be performed as a part of the process 600 described above (e.g., the synchronization process 700 may be performed during and/or between 610 and 612 of the process 600). At 702, a synchronization workload is estimated using the tracking bitmap of the delta component. In some examples, estimating the synchronization workload includes identifying the data blocks of the delta component that have been changed based on the tracking bitmap and multiply the number of identified data blocks by the size of each data block. This provides a maximum quantity of memory that may need to be copied during the synchronization process.

At 704, the base component is reconciled. In some examples, reconciling the base component includes reconciling prepared writes of the base component by determining whether to commit them or abort them prior to synchronization.

At 706, the unwritten portions of the workload are filtered out of the workload. In some examples, this step is only performed if the synchronization source is confirmed to be a delta component. Because the delta component is initialized with unwritten data locations and only writes to the data locations largely during the downtime of the base component, much of the data that is initially included in the synchronization workload may be filtered out, as described herein. Thus, only the data locations affected by the routed write operations to the delta component are used as part of the workload after the filtering.

At 708, the data of the workload is copied from the synchronization source to the base component. As described herein, the delta component is prioritized as the synchronization source. In examples where the delta component is the synchronization source, the workload data being copied may be limited to only the data that was changed during the downtime of the base component. Alternatively, if the synchronization source is not the delta component, the filtering of unwritten portions may not have been possible and the copying of the workload data may include copying entire data blocks that include change data locations from the synchronization source to the base component.

Additional Example Scenarios

Aspects of the disclosure enable various additional scenarios, such as next described.

In an example, a distributed data object includes a first data component and a second data component. The two components are configured to be mirrored, such that they both store the same data to enhance the data durability and data availability of the distributed data object.

During operation of the system, it is determined that a host device of the first component needs to be switched to a maintenance mode and updated, during which the first component will become unavailable. Before the first component is transitioned to an unavailable state, the system generates a delta component associated with the first component. The delta component is configured to mirror I/O traffic to the first component after its generation. The delta component is generated with unwritten data blocks of the address space of the first component.

After generation of the delta component is complete, the first component is transitioned to an unavailable state and the host device associated with the first component enters a maintenance mode for a period. During the period, the delta component receives I/O traffic targeted at the first component and records the associated data changes in the unwritten data blocks. Further, the delta component indicates the data blocks that are changed in a tracking bitmap as described herein.

After the maintenance on the host device is complete, the first component becomes available again but is in a stale state due to having missed some I/O traffic while unavailable. The system identifies that the delta component is available and performs a synchronization process from the delta component to the first component. The synchronization process includes identifying data blocks that have been changed by the I/O traffic using the tracking bitmap of the delta component to form a synchronization workload, filtering out the unwritten data locations of the data blocks in the synchronization workload, and copying the remaining data locations of the synchronization workload from the delta component to the first component. After the synchronization process is complete, the first component is up-to-date, and the delta component is marked for removal by a cleanup process of the system.

In a related example, during the downtime of the first component, the second component unexpectedly fails. Based on the detection of this failure, the system causes the delta component to begin a second tracking bitmap that tracks changes that occur from I/O traffic starting at the time the second component became unavailable.

After the first component is brought back up to date via the synchronization process, the second tracking bitmap is provided to the first component before the delta component is removed, such that the first component is configured to continue tracking data changes that the second component has missed. When the second component is brought back online, the first component may be used, along with the tracking bitmap received from the delta component, to synchronize with the second component and bring it up to date as well.

Exemplary Operating Environment

Figure 8:
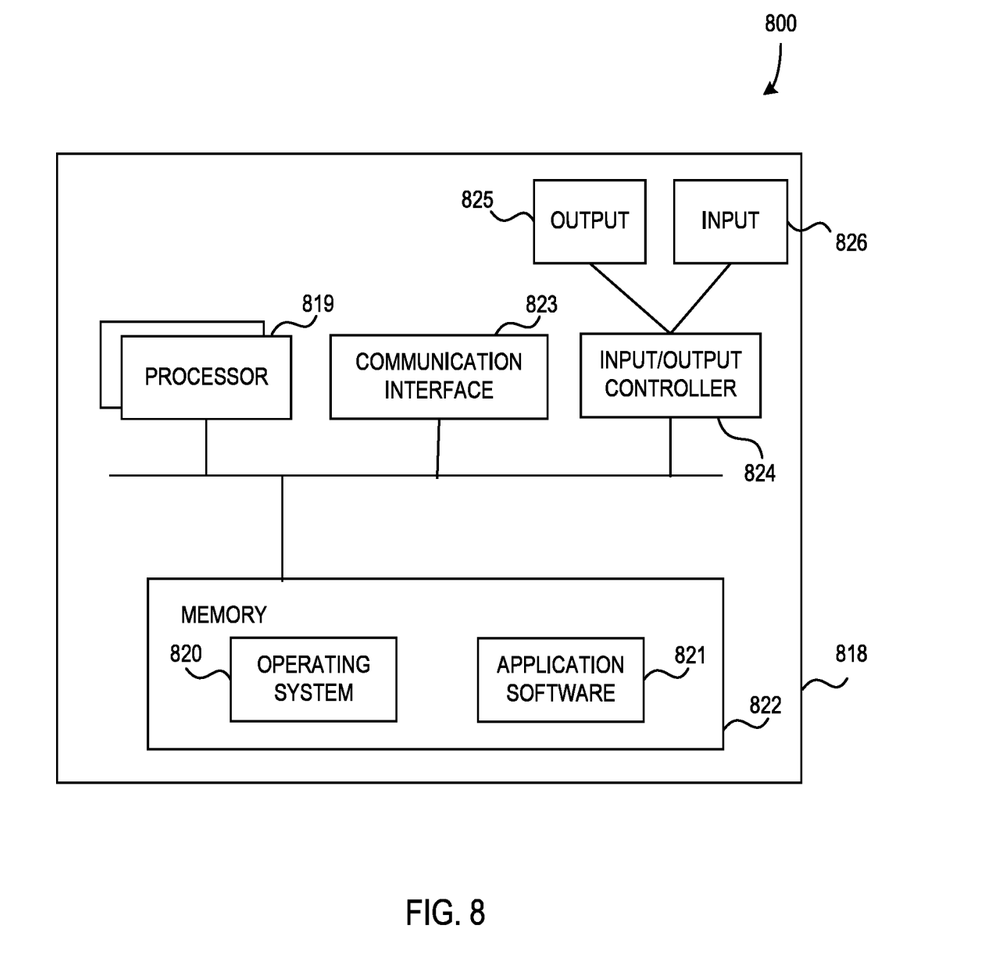
FIG. 8 illustrates a computing apparatus according to an embodiment as a functional block diagram.

The present disclosure is operable with a computing apparatus according to an embodiment as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hard-coded machine. Platform software comprising an operating system 820 or any other suitable platform software may be provided on the apparatus 818 to enable application software 821 to be executed on the device. According to an embodiment, generating delta components for base components, tracking I/O traffic with the delta components, and synchronizing the base components from the delta components as described herein may be accomplished by software, hardware, and/or firmware.

Computer executable instructions may be provided using any computer-readable media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g. using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g. a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for enhancing data durability of a base component using a delta component comprises: at least one processor; and at least one memory comprising computer program code, the at least one memory and the computer program code configured to, with the at least one processor, cause the at least one processor to: generate a delta component based on the base component becoming unavailable, wherein the delta component is configured to have an address space matching an address space of the base component and a tracking bitmap including a plurality of bits associated with data blocks of the address space of the delta component; route a write operation targeted for the base component to the delta component; based on routing the write operation targeted for the base component to the delta component, change a bit associated with a data block affected by the routed write operation in the tracking bitmap of the delta component; based on detecting the base component becoming available, synchronize, using the tracking bitmap, the data block affected by the routed write operation from the delta component to the base component; and remove the delta component.

An example computerized method for enhancing data durability of a base component using a delta component comprises: generating, by a processor, a delta component based on the base component becoming unavailable, wherein the delta component is configured to include unwritten storage space with an address space matching an address space of the base component and a tracking bitmap including a plurality of bits associated with data blocks of the address space of the delta component; routing, by the processor, a write operation targeted for the base component to the delta component; based on routing the write operation targeted for the base component to the delta component, changing, by the processor, a bit associated with a data block affected by the routed write operation in the tracking bitmap of the delta component; based on detecting the base component becoming available, synchronizing, by the processor, using the tracking bitmap, the data block affected by the routed write operation from the delta component to the base component; and removing, by the processor, the delta component.

One or more computer storage media have computer-executable instructions for enhancing data durability of a base component using a delta component that, upon execution by a processor, cause the processor to at least: generate a delta component based on the base component becoming unavailable, wherein the delta component is configured to include unwritten storage space with an address space matching an address space of the base component and a tracking bitmap including a plurality of bits associated with data blocks of the address space of the delta component; route a write operation targeted for the base component to the delta component; based on routing the write operation targeted for the base component to the delta component, change a bit associated with a data block affected by the routed write operation in the tracking bitmap of the delta component; based on detecting the base component becoming available, synchronize, using the tracking bitmap, the data block affected by the routed write operation from the delta component to the base component; and remove the delta component.

Alternatively, or in addition to the other examples described herein, examples include any combination of the following:

wherein synchronizing the data block affected by the routed write operation from the delta component to the base component includes identifying a subset of data locations in the affected data block to which data has been written in the delta component; and writing the identified subset of data locations to which data has been written from the delta component to the base component.

wherein generating the delta component is based on receiving a notification prior to the base component becoming unavailable; and wherein the delta component is generated prior to the base component becoming unavailable.

further comprising: identifying, by the processor, a set of synchronization sources based on detecting the base component becoming available, wherein the set of synchronization sources includes the delta component and at least one mirrored component associated with the base component; selecting, by the processor, the delta component as a synchronization source for the base component based on a defined prioritization of available delta components; and wherein synchronizing the affected data block from the delta component to the base component is further based on the delta component being selected as a synchronization source for the base component.

wherein the identified set of synchronization sources includes only the delta component; and wherein synchronizing the affected data block from the delta component to the base component is performed using only the delta component, whereby the base component is synchronized based only on the delta component.

wherein the base component is part of a redundant array of independent disks (RAID) and generating the delta component includes placing the delta component into a delta RAID level configured to mirror write operations targeted at the base component.

wherein the RAID is configured to include at least one of RAID 0 levels, RAID 0 levels, RAID 5 levels, or RAID 6 levels.

wherein removing the delta component further includes transitioning the delta component to a degraded state and notifying a cleanup process to delete the delta component.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for generating a delta component based on the base component becoming unavailable, wherein the delta component is configured to include unwritten storage space with an address space matching an address space of the base component and a tracking bitmap including a plurality of bits associated with data blocks of the address space of the delta component; exemplary means for routing a write operation targeted for the base component to the delta component; based on routing the write operation targeted for the base component to the delta component, exemplary means for changing a bit associated with the data block affected by the routed write operation in the tracking bitmap of the delta component; based on detecting the base component becoming available, exemplary means for synchronizing, based on the tracking bitmap, the data blocks affected by the routed write operations from the delta component to the base component; and exemplary means for removing the delta component.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for enhancing data durability of a base component using a temporary component and a mirrored component, the method comprising:
    copying, by the mirrored component, all write operations directed to the base component to the mirrored component;
    generating, by a processor, a temporary component based on the base component becoming unavailable, wherein the temporary component is configured to include blank storage space with an address space matching an address space of the base component and a tracking component that includes a plurality of bits associated with data blocks of the address space of the temporary component;
    routing, by the processor, a write operation targeted for the base component to the temporary component, and the mirrored component;
    based on routing the write operation targeted for the base component to the temporary component and the mirrored component, writing data associated with the write operation to (i) a data block of the data blocks of the address space of the temporary component and (ii) the mirrored component;
    based on writing the data to the data block of the temporary component, changing, by the processor, a bit associated with the data block in the tracking component;
    based on detecting the base component becoming available, selecting the temporary component over the mirrored component as a source for synchronizing the base component to include the data associated with the write operation that was routed to the temporary component and the mirrored component while the base component was unavailable;
    estimating, by the processor, a synchronization workload using the tracking component;
    filtering out unwritten portions of the synchronization workload from the temporary component, the filtering out leaving written portions of the synchronization workload in the temporary component; and
    copying data of the written portions of the synchronization workload from the temporary component to the base component.

2. The method of claim 1, wherein copying data of the written portions of the synchronization workload from the temporary component to the base component includes identifying a subset of data locations in the temporary component; and
    writing the identified subset of data locations from the temporary component to the base component.

3. The method of claim 1, wherein generating the temporary component is based on receiving a notification prior to the base component becoming unavailable; and
    wherein the temporary component is generated prior to the base component becoming unavailable.

4. The method of claim 1, further comprising:
    determining that the copying data of the written portions of the synchronization workload from the temporary component to the base component is not complete and the temporary component is unavailable;
    based on the determining of the temporary component becoming unavailable, restarting synchronization of the base component using the mirrored component.

5. The method of claim 1, wherein the base component is part of a redundant array of independent disks (RAID) and generating the temporary component includes placing the temporary component into a temporary RAID level configured to mirror write operations targeted at the base component.

6. The method of claim 1, further comprising transitioning the temporary component to a degraded state and notifying a cleanup process to delete the temporary component.

7. A computer system for enhancing data durability of a base component using a temporary component and a mirrored component, the computer system comprising:
    a processor; and
    a non-transitory computer readable medium having stored thereon program code for transferring data to another computer system, the program code causing the processor to:
        copy all write operations directed to the base component to the mirrored component;
        generate a temporary component based on the base component becoming unavailable, wherein the temporary component is configured to have an address space matching an address space of the base component and a tracking component that includes a plurality of bits associated with data blocks of the address space of the temporary component;
        route a write operation targeted for the base component to the temporary component, and the mirrored component;
        based on routing the write operation targeted for the base component to the temporary component and the mirrored component, write data associated with the write operation to (i) a data block of the data blocks of the address space of the temporary component and (ii) the mirrored component;
        based on writing the data to the data block of the temporary component, change a bit associated with the data block in the tracking component;

based on detecting the base component becoming available, select the temporary component over the mirrored component as a source for synchronizing the base component to include the data associated with the write operation that was routed to the temporary component and the mirrored component while the base component was unavailable;

estimate, by the processor, a synchronization workload using the tracking component;

filter out unwritten portions of the synchronization workload from the temporary component, the filtering out leaving written portions of the synchronization workload in the temporary component; and copy data of the written portions of the synchronization workload from the temporary component to the base component.

8. The computer system of claim 7, wherein copying data of the written portions of the synchronization workload from the temporary component to the base component includes identifying a subset of data locations in the temporary component; and writing the identified subset of data locations from the temporary component to the base component.

9. The computer system of claim 7, wherein generating the temporary component is based on receiving a notification prior to the base component becoming unavailable; and wherein the temporary component is generated prior to the base component becoming unavailable.

10. The computer system of claim 7, wherein the program code is further operative to:

determine that the copying data of the written portions of the synchronization workload from the temporary component to the base component is not complete and the temporary component is unavailable;

based on the determining of the temporary component becoming unavailable, restart synchronization of the base component using the mirrored component.

11. The computer system of claim 7, wherein the base component is part of a redundant array of independent disks (RAID) and generating the temporary component includes placing the temporary component into a temporary RAID level configured to mirror write operations targeted at the base component.

12. The computer system of claim 7, further comprising transitioning the temporary component to a degraded state and notifying a cleanup process to delete the temporary component.

13. A non-transitory computer storage medium having stored thereon program code executable by a first computer system at a first site, the program code embodying a method comprising:

copying, by a mirrored component, all write operations directed to a base component to the mirrored component;

generating a temporary component based on a base component becoming unavailable, wherein the temporary component is configured to include blank storage space with an address space matching an address space of the base component and a tracking component including a plurality of bits associated with data blocks of the address space of the temporary component;

routing a write operation targeted for the base component to the temporary component, and the mirrored component;

based on routing the write operation targeted for the base component to the temporary component and the mirrored component, writing data associated with the write operation to a data block of the data blocks of the address space of the temporary component and (ii) the mirrored component;

based on writing the data to the data block of the temporary component, changing a bit associated with the data block in the tracking component;

based on detecting the base component becoming available, selecting the temporary component over the mirrored component as a source for synchronizing the base component to include the data associated with the write operation that was routed to the temporary component and the mirrored component while the base component was unavailable;

estimating a synchronization workload using the tracking component;

filtering out unwritten portions of the synchronization workload from the temporary component, the filtering out leaving written portions of the synchronization workload in the temporary component; and copying data of the written portions of the synchronization workload from the temporary component to the base component.

14. The non-transitory computer storage medium of claim 13, wherein copying data of the written portions of the synchronization workload from the temporary component to the base component includes identifying a subset of data locations in the temporary component; and writing the identified subset of data locations from the temporary component to the base component.

15. The non-transitory computer storage medium of claim 13, wherein generating the temporary component is based on receiving a notification prior to the base component becoming unavailable; and wherein the temporary component is generated prior to the base component becoming unavailable.

16. The non-transitory computer storage medium of claim 13, wherein the program code further comprises:

determining that the copying data of the written portions of the synchronization workload from the temporary component to the base component is not complete and the temporary component is unavailable;

based on the determining of the temporary component becoming unavailable, restarting synchronization of the base component using the mirrored component.

17. The non-transitory computer storage medium of claim 13, wherein the base component is part of a redundant array of independent disks (RAID) and generating the temporary component includes placing the temporary component into a temporary RAID level configured to mirror write operations targeted at the base component.

18. The non-transitory computer storage medium of claim 13, wherein the program code further comprises transitioning the temporary component to a degraded state and notifying a cleanup process to delete the temporary component.

* * * * *